(12) United States Patent
Yoshida et al.

(10) Patent No.: US 6,300,009 B1
(45) Date of Patent: Oct. 9, 2001

(54) LITHIUM SECONDARY BATTERY

(75) Inventors: Toshikazu Yoshida, Hirakata; Yoshinori Kida, Katano; Masahisa Fujimoto, Osaka; Shin Fujitani, Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/468,203

(22) Filed: Dec. 20, 1999

(30) Foreign Application Priority Data

Dec. 25, 1998 (JP) .................................................. 10-376751
Sep. 30, 1999 (JP) .................................................. 11-279188

(51) Int. Cl.[7] .................................................. H01M 4/58
(52) U.S. Cl. .................................. 429/218.1; 429/231.95; 429/220; 429/221; 429/223; 429/224; 429/225; 429/231.5; 429/231.6
(58) Field of Search ..................... 429/218.1, 231.95, 429/220, 221, 223, 224, 225, 231.5, 231.6

(56) References Cited

U.S. PATENT DOCUMENTS 4,139,682  2/1979  Jacobson et al. ..................... 429/218
4,801,441  1/1989  Schleich ............................... 423/509

FOREIGN PATENT DOCUMENTS

| 56-103872 A | 8/1981 | (JP) . |
| 57-172661 A | 10/1982 | (JP) . |
| 60-175371 A | 9/1985 | (JP) . |
| 60-175374 A | 9/1985 | (JP) . |

*Primary Examiner*—Laura Weiner
(74) *Attorney, Agent, or Firm*—Kubovcik & Kubovcik

(57) ABSTRACT

In a lithium secondary battery of this invention, an active material of either a positive electrode or a negative electrode includes a composite sulfide having the same crystal structure as $MoS_2$ or $Mo_2S_3$, or the composite sulfide including lithium, and the composite sulfide is represented by a composition formula, $M_xMo_{1-x}S_y$, wherein M is at least one element selected from the group consisting of Cu, V, Cr, Mn, Fe, Co, Ni, Ti, Y, Cd, In, La, Ce, Pr, Nd, Sm, W, Pt, Pb, Ca, Sr and Ba; $0<X<0.46$; and $1.5 \leq Y \leq 2.0$. Thus, the lithium secondary battery using a molybdenum composite sulfide as an active material of a positive or negative electrode can attain good charge-discharge cycle performance.

17 Claims, 7 Drawing Sheets

BA (Lithium Secondary Battery)

LITHIUM SECONDARY BATTERY

BACKGROUND OF THE INVENTION

This application claims the priority of Japanese Patent Applications No. 10-376751/1998 filed on Dec. 25, 1998 and No. 11-279188/1999 filed on Sep. 30, 1999, which are incorporated herein by reference.

The present invention relates to a lithium secondary battery using a molybdenum sulfide as an active material of a positive electrode or a negative electrode and more particularly, it relates to improvement of the molybdenum sulfide for the purpose of improving the charge-discharge cycle performance of such a lithium secondary battery.

A lithium battery using a molybdenum sulfide, such as molybdenum disulfide ($MoS_2$) and molybdenum trisulfide ($MoS_3$), as a positive electrode active material is disadvantageously poor in the storage characteristic because sulfur eluted into the nonaqueous electrolyte reacts with lithium included in the negative electrode during the storage.

For the purpose of suppressing the reaction between sulfur and lithium, a positive electrode mixed material including a molybdenum sulfide and a powder of at least one metal reactive to sulfur selected from the group consisting of copper, silver, molybdenum, titanium, niobium and alloys of these metals has been proposed as a positive electrode material (Japanese Laid-Open Patent Publication No. 60-175371/1985).

When this positive electrode mixed material is used in a secondary battery, however, although the storage characteristic can be improved, the charge-discharged cycle performance cannot be sufficiently improved. This is because the unstable crystal structure of a molybdenum sulfide itself cannot be stabilized by adding the metal powder thereto (A. J. Jacobon, p. 2277, Journal of Electrochemical Society (1979)).

The present invention was devised in view of the aforementioned conventional problems, and the object is providing a lithium secondary battery using a molybdenum sulfide as an active material of a positive electrode or a negative electrode and exhibiting good charge-discharge cycle performance.

SUMMARY OF THE INVENTION

In order to achieve the object, in the lithium secondary battery of this invention (present battery) comprising a positive electrode, a negative electrode and a nonaqueous electrolyte, an active material of either the positive electrode or the negative electrode includes a composite sulfide having the same crystal structure as $MoS_2$ or $Mo_2S_3$, or the composite sulfide including lithium, which is represented by a composition formula, $M_XMo_{1-X}S_Y$, wherein M is at least one element selected from the group consisting of Cu, V, Cr, Mn, Fe, Co, Ni, Ti, Y, Cd, In, La, Ce, Pr, Nd, Sm, W, Pt, Pb, Ca, Sr and Ba; $0<X<0.46$; and $1.5 \leq Y \leq 2.0$.

By using the specific composite sulfide, the invention provides a lithium secondary battery using a molybdenum sulfide as an active material of a positive electrode or a negative electrode and exhibiting good charge-discharge cycle performance.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE INVENTION

Figure 1:
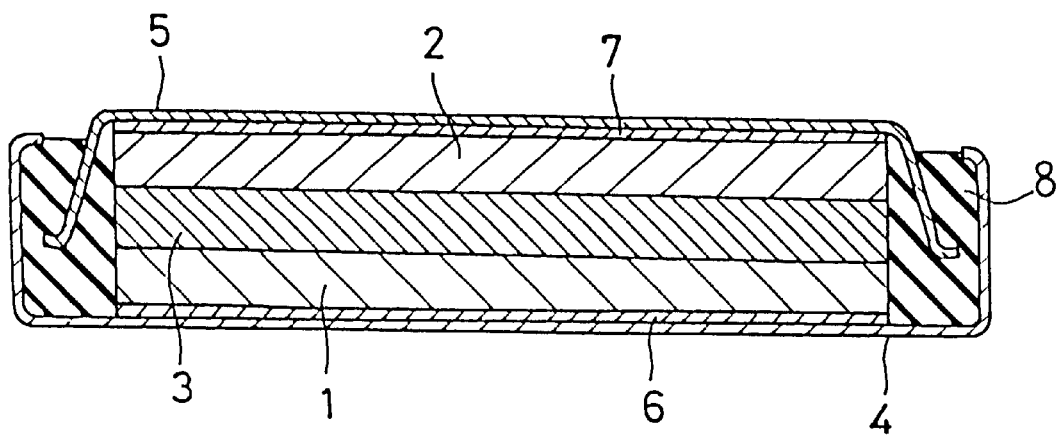
FIG. 1 is a sectional view of a flat lithium secondary battery fabricated in each embodiment.

In the composition formula, $M_XMo_{1-X}S_Y$, of the active material used in the present battery, M is preferably at least one element selected from the group consisting of V, Cr, Mn, Ni, Ti, Y, La, Ce, Nd, Sm, Ca, Sr and Ba, and more preferably at least one element selected from the group consisting of Mn, Ce and Ca.

As the composite sulfide, a powder obtained by baking a mixture of simple substances and/or compounds of the elements at 700 through 1700° C. and crushing the baked mixture is preferably used because the resultant lithium secondary battery can attain further better charge-discharge cycle performance. When the baking temperature is lower than 700° C., the crystal phase of the baked substance is separated into two phases, that is, a $MoS_2$ phase or a $Mo_2S_3$ phase and a Mo phase (simple substance phase) incapable of functioning as an active material. On the other hand, when the baking temperature exceeds 1700° C., the baked substance is melted, resulting in giving an inhomogeneous composition after cooling. Therefore, when the baking temperature is out of the above-described range, it is difficult to obtain a lithium secondary battery exhibiting very good charge-discharge cycle performance.

In the composition formula, X should be smaller than 0.46 because a simple substance phase or a sulfide phase of the element M deposits when X is 0.46 or more, resulting in degrading the charge-discharge cycle performance to the contrary. A composite sulfide wherein $0.02 \leq X \leq 0.45$ is preferred because such a composite sulfide has a particularly stable crystal structure. Furthermore, in the composition formula, Y should be 1.5 or more and 2.0 or less because neither a Mo phase or nor a S phase deposits and hence the $MoS_2$ phase or the $Mo_2O_3$ phase functioning as the active material can stably exist when Y falls within this range (Binary Alloy Phase Diagrams (Mo—S binary alloy phase diagram), Vol. 2, p. 1627 (1986), American Society for Metals).

Specific examples of the present battery are divided into the following three types:

(1) A lithium secondary battery using the composite sulfide including lithium as a positive electrode active material, and a carbon material, lithium alloy or metallic lithium as a negative electrode active material, which needs charge before initial use. This type of lithium secondary battery which needs charge before initial use is hereinafter sometimes referred to as a present battery (A).

(2) A lithium secondary battery using the composite sulfide or the composite sulfide including lithium as a positive electrode active material, and a lithium-containing carbon material, lithium alloy or metallic lithium as a negative electrode active material, which does not need charge before initial use. This type of lithium secondary battery which does not need charge before initial use is hereinafter sometimes referred to as a present battery (B).

In the present batteries (A) and (B), the charge voltage is approximately 3 V and the discharge voltage is approximately 2 V. Examples of the carbon material are graphite (natural graphite and artificial graphite), coke and an organic baked substance. Examples of the lithium alloy are Li—Al alloy, Li—Mg alloy, Li—In alloy and Li—Al—Mn alloy. For the improvement of the charge-discharge cycle performance, the carbon material is preferably used. When the carbon material is used, a dendrite crystal in the shape of branches, which can cause internal short-circuit, can be prevented from being generated during charge-discharge cycles, and a compound such as $LiS_2$, which can cause inactivation, can be prevented from depositing on the surface of the negative electrode as a result of a reaction between sulfur dissolved in a small amount in the electrolyte and lithium included in the negative electrode (Binary Alloy Phase Diagrams (Li—S binary alloy phase diagram), Vol. 2, p. 1500 (1986), American Society for Metals). When the carbon material is used in the present battery (A), it is preferred for attaining large capacity that the carbon material does not include lithium. Also, in the present battery (B), it is preferred for attaining large capacity that the composite sulfide does not include lithium.

(3) A lithium secondary battery using a lithium-containing transition metal oxide as a positive electrode active material, and the composite sulfide or the composite sulfide including lithium as a negative electrode active material, which needs charge before initial use. This type of lithium secondary battery which needs charge before initial use is hereinafter sometimes referred to as a present battery (C).

Examples of the lithium-containing transition metal oxide are $LiCoO_2$, $LiNiO_2$, $LiMn_2O_4$, $LiMnO_2$, $MnO_2$ doped with Li, $LiCo_{0.5}Ni_{0.5}O_2$, $LiNi_{0.7}Co_{0.2}Mn_{0.1}O_2$, $LiCo_{0.9}Ti_{0.1}O_2$ and $LiCo_{0.5}Ni_{0.4}Zr_{0.1}O_2$. In the present battery (C) using such a lithium-containing transition metal oxide as the positive electrode active material, the charge voltage is approximately 2.5 V and the discharge voltage is approximate 1.5 V. The present battery (C) can exhibit very good charge-discharge cycle performance because the charge voltage is so low that the molybdenum composite sulfide used in the negative electrode can be suppressed from being excessively charged. In the present battery (C), it is preferred for attaining large capacity that the composite sulfide does not include lithium.

The invention is characterized by the specific molybdenum sulfide used as the active material of the positive or negative electrode for providing a lithium secondary battery exhibiting good charge-discharge cycle performance. Therefore, any of conventionally known materials can be used for other battery members such as a nonaqueous electrolyte.

Examples of a solvent for the nonaqueous electrolyte are a mixed solvent including a cyclic carbonic ester such as ethylene carbonate, propylene carbonate and butylene carbonate, and a chain carbonic ester such as dimethyl carbonate, methylethyl carbonate and diethyl carbonate; and a mixed solvent of a cyclic carbonic ester and an ether such as 1,2-dimethoxyethane and 1,2-diethoxyethane. Examples of a solute for the nonaqueous electrolyte are $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, and a mixture including any of them. As the nonaqueous electrolyte, a gel polymeric electrolyte obtained by impregnating a polymer such as poly(ethylene oxide) and polyacrylonitrile with a nonaqueous electrolyte; or an inorganic solid electrolyte such as LiI and $Li_3N$ can be also used.

The element M included in the molybdenum sulfide forms, together with sulfur, a stable compound having a decomposition temperature of 1000° C. or more (Binary Alloy Phase Diagrams (Mo—S binary alloy phase diagram), Vol. 2, p. 1627 (1986), American Society for Metals). Specifically, since the element M is comparatively strongly chemically bonded to sulfur, it occupies part of the crystal lattice of the $MoS_2$ phase or the $Mo_2S_3$ phase, so as to stabilize the crystal structure of the molybdenum sulfide. Accordingly, the present battery can exhibit good charge-discharge cycle performance.

Other features of the invention will become more apparent in the course of the following descriptions of exemplary embodiments which are given for illustration of the invention and not intended to be limiting thereof.

Embodiment

Experiment 1

Lithium secondary batteries (present batteries (A)) each of which uses a composite sulfide including lithium as a positive electrode active material and a carbon material not including lithium as a negative electrode active material and needs charge before initial use were fabricated, so as to examine the charge-discharge cycle performance thereof.

Preparation of positive electrodes

Cu, Mo and S each having purity of 99.9% were mixed in a mortar in an atomic ratio of 0.2:0.8:2.0. The resultant mixture was pressed in a mold having a diameter of 17 mm at a pressure of 115 kg/cm$^2$, and the resultant was baked in an argon atmosphere at 1000° C. for 10 hours. The thus obtained baked substance was crushed in a mortar, thereby preparing a powder with an average particle size of 10 $\mu$m of a molybdenum composite sulfide represented by a composition formula, $Cu_{0.2}Mo_{0.8}S_2$. Furthermore, the same procedures were repeated with Cu replaced with V, Cr, Mn, Fe, Co, Ni, Ti, Y, Cd, In, La, Ce, Pr, Nd, Sm, W, Pt, Pb, Ca, Sr or Ba, so as to prepare powders each with an average particle size of 10 $\mu$m of molybdenum composite sulfides respectively represented by composition formulas, $V_{0.2}Mo_{0.8}S_2$, $Cr_{0.2}Mo_{0.8}S_2$, $Mn_{0.2}Mo_{0.8}S_2$, $Fe_{0.2}Mo_{0.8}S_2$, $Co_{0.2}Mo_{0.8}S_2$, $Ni_{0.2}Mo_{0.8}S_2$, $Ti_{0.2}Mo_{0.8}S_2$, $Y_{0.2}Mo_{0.8}S_2$, $Cd_{0.2}Mo_{0.8}S_2$, $In_{0.2}Mo_{0.8}S_2$, $La_{0.2}Mo_{0.8}S_2$, $Ce_{0.2}Mo_{0.8}S_2$, $Pr_{0.2}Mo_{0.8}S_2$, $Nd_{0.2}Mo_{0.8}S_2$, $Sm_{0.2}Mo_{0.8}S_2$, $W_{0.2}Mo_{0.8}S_2$, $Pt_{0.2}Mo_{0.8}S_2$, $Pb_{0.2}Mo_{0.8}S_2$, $Ca_{0.2}Mo_{0.8}S_2$, $Sr_{0.2}Mo_{0.8}S_2$, and $Ba_{0.2}Mo_{0.8}S_2$. Moreover, the same procedures were repeated with Cu replaced with a mixture of Mn and Ce (in an atomic ratio of 0.1:0.1), a mixture of Mn and Ca (in an atomic ratio of 0.1:0.1), a mixture of Ce and Ca (in an atomic ratio of 0.1:0.1) or a mixture of Mn, Ce and Ca (in an atomic ratio of 0.1:0.05:0.05), so as to prepare powders each with an average particle size of 10 μm of molybdenum composite sulfides respectively represented by composition formulas, $Mn_{0.1}Ce_{0.1}Mo_{0.8}S_2$, $Mn_{0.1}Ca_{0.1}Mo_{0.8}S_2$, $Ce_{0.1}Ca_{0.1}Mo_{0.8}S_2$, and $Mn_{0.1}Ce_{0.05}Ca_{0.05}Mo_{0.8}S_2$.

A mixture of 85 parts by weight of each of the molybdenum composite sulfide powders, 10 parts by weight of a carbon powder serving as a conductive agent and 5 parts by weight of poly(vinylidene fluoride) serving as a binder was kneaded with NMP (N-methylpyrrolidone), thereby preparing slurry. The slurry was applied on one surface of an aluminum collector with a thickness of 20 μm by a doctor blade method, and the resultant was dried at 150° C. and then punched into a disk with a diameter of 10 mm and a thickness of approximately 80 μm. Thus, positive electrodes were prepared.

Each of the positive electrodes and a metallic lithium plate opposing each other with a microporous film of polypropylene sandwiched therebetween were immersed in an electrolyte obtained by dissolving $LiPF_6$ in a concentration of 1 mol/liter in a mixed solvent including ethylene carbonate and diethyl carbonate in a volume ratio of 1:1. Under this condition, electrolysis was conducted with a constant current of 100 μA until the positive electrode potential was lowered to 1.5 V (vs. Li/Li$^+$), so as to incorporate lithium into the molybdenum composite sulfide of each positive electrode.

Preparation of negative electrode

A mixture of 95 parts by weight of a natural graphite powder and 5 parts by weight of a poly(vinylidene fluoride) powder serving as a binder was kneaded with NMP to give slurry. The slurry was applied on one surface of a copper collector with a thickness of 20 μm by the doctor blade method, and the resultant was dried at 150° C. and then punched into a disk with a diameter of 10 mm and a thickness of approximately 60 μm. Thus, a negative electrode was prepared.

Preparation of electrolyte

In a mixed solvent including ethylene carbonate and diethyl carbonate in a volume ratio of 1:1, $LiPF_6$ was dissolved in a concentration of 1 mol/liter, thereby preparing an electrolyte.

Fabrication of lithium secondary batteries

Flat lithium secondary batteries A1 through A26 present batteries) were fabricated by using the respective positive electrodes, the negative electrode and the electrolyte prepared as described above. As a separator, a microporous film of polypropylene was used. FIG. 1 is a sectional view of each lithium secondary battery thus fabricated. The lithium secondary battery BA of FIG. 1 comprises a positive electrode 1, a negative electrode 2, a separator 3 a positive electrode can 4, a negative electrode can 5, a positive electrode collector 6, a negative electrode collector 7, an insulating packing 8 and the like. The positive electrode 1 and the negative electrode 2 opposing each other with the separator 3 sandwiched therebetween are housed in a battery can formed by the positive electrode can 4 and the negative electrode can 5. The positive electrode 1 is connected with the positive electrode can 4 through the positive electrode collector 6 and the negative electrode 2 is connected with the negative electrode can 5 through the negative electrode collector 7, so that chemical energy generated within the battery can be taken out as electrical energy.

Charge-discharge cycle test

With regard to each of the batteries, 50 charge-discharge cycles were run in each cycle of which the battery was charged to 3.0 V with 100 μA and discharged to 1.5 V with 100 μA at 25° C., so as to obtain a capacity retention ratio (%) defined by the following formula. All capacity retention ratios mentioned below are also defined by the same formula. The capacity retention ratios (%) of the respective batteries are shown in Table 1. In all the batteries A1 through A26, the average discharge voltage was approximately 2.0 V and the initial capacity was 1.32 through 1.35 mAh.

Capacity retention ratio (%)=(Discharge capacity at 50th cycle/Discharge capacity at 1st cycle)×100

TABLE 1

| Battery | Positive electrode active material | Negative electrode active material | Capacity retention ratio (%) |
|---|---|---|---|
| A1 | $Cu_{0.2}Mo_{0.8}S_2$ | Natural graphite | 91 |
| A2 | $V_{0.2}Mo_{0.8}S_2$ | Natural graphite | 93 |
| A3 | $Cr_{0.2}Mo_{0.8}S_2$ | Natural graphite | 92 |
| A4 | $Mn_{0.2}Mo_{0.8}S_2$ | Natural graphite | 94 |
| A5 | $Fe_{0.2}Mo_{0.8}S_2$ | Natural graphite | 90 |
| A6 | $Co_{0.2}Mo_{0.8}S_2$ | Natural graphite | 91 |
| A7 | $Ni_{0.2}Mo_{0.8}S_2$ | Natural graphite | 93 |
| A8 | $Ti_{0.2}Mo_{0.8}S_2$ | Natural graphite | 93 |
| A9 | $Y_{0.2}Mo_{0.8}S_2$ | Natural graphite | 92 |
| A10 | $Cd_{0.2}Mo_{0.8}S_2$ | Natural graphite | 91 |
| A11 | $In_{0.2}Mo_{0.8}S_2$ | Natural graphite | 90 |
| A12 | $La_{0.2}Mo_{0.8}S_2$ | Natural graphite | 92 |
| A13 | $Ce_{0.2}Mo_{0.8}S_2$ | Natural graphite | 94 |
| A14 | $Pr_{0.2}Mo_{0.8}S_2$ | Natural graphite | 91 |
| A15 | $Nd_{0.2}Mo_{0.8}S_2$ | Natural graphite | 93 |
| A16 | $Sm_{0.2}Mo_{0.8}S_2$ | Natural graphite | 92 |
| A17 | $W_{0.2}Mo_{0.8}S_2$ | Natural graphite | 91 |
| A18 | $Pt_{0.2}Mo_{0.8}S_2$ | Natural graphite | 89 |
| A19 | $Pb_{0.2}Mo_{0.8}S_2$ | Natural graphite | 90 |
| A20 | $Ca_{0.2}Mo_{0.8}S_2$ | Natural graphite | 94 |
| A21 | $Sr_{0.2}Mo_{0.8}S_2$ | Natural graphite | 92 |
| A22 | $Ba_{0.2}Mo_{0.8}S_2$ | Natural graphite | 92 |
| A23 | $Mn_{0.1}Ce_{0.1}Mo_{0.8}S_2$ | Natural graphite | 95 |
| A24 | $Mn_{0.1}Ca_{0.1}Mo_{0.8}S_2$ | Natural graphite | 95 |
| A25 | $Ce_{0.1}Ca_{0.1}Mo_{0.8}S_2$ | Natural graphite | 94 |
| A26 | $Mn_{0.1}Ce_{0.05}Ca_{0.05}Mo_{0.8}S_2$ | Natural graphite | 95 |

It is understood from Table 1 that the present batteries A1 through A26 have capacity retention ratios as large as 89 through 95% and can exhibit good charge-discharge cycle performance. Among the present batteries A1 through A26, the capacity retention ratio is particularly large in the present batteries A2 through A4, A7 through A9, A12, A13, A15, A16 and A20 through A26, and is the largest in the present batteries A4, A13, A20, A23 through A26. This means that the element M in the composition formula, $M_XMo_{1-X}S_Y$, is preferably V, Cr, Mn, Ni, Ti, Y, La, Ce, Nd, Sm, Ca, Sr or Ba, and more preferably Mn, Ce or Ca.

Experiment 2

Lithium secondary batteries (present batteries (B)) each of which uses a composite sulfide not including lithium as a positive electrode active material and metallic lithium or Li—Al, alloy as a negative electrode active material and does not need charge before initial use were fabricated, so as to examine the charge-discharge cycle performance thereof.

Preparation of positive electrodes

Cu, Mo and S each with purity of 99.9% were mixed in a mortar in an atomic ratio of 0.2:0.8:2.0, and the resultant mixture was pressed in a mold with a diameter of 17 mm at a pressure of 115 kg/cm$^2$. The resultant was baked in an argon atmosphere at 1000° C. for 10 hours, and the thus obtained baked substance was crushed in a mortar, thereby preparing a powder having an average particle size of 10 μm of a molybdenum composite sulfide represented by a composition formula, $Cu_{0.2}Mo_{0.8}S_2$. Furthermore, the same procedures were repeated with Cu replaced with Ti, thereby preparing a powder having an average particle size of 10 μm of a molybdenum composite sulfide represented by a formula, $Ti_{0.2}Mo_{0.8}S_2$.

A mixture of 85 parts by weight of any of the molybdenum composite sulfide powders, 10 parts by weight of a carbon powder serving as a conductive agent and 5 parts by weight of a poly(vinylidene fluoride) powder serving as a binder was kneaded with NMP to give slurry. The slurry was applied on one surface of an aluminum collector with a thickness of 20 μm by the doctor blade method, and the resultant was dried at 150° C. and then punched into a disk with a diameter of 10 mm and a thickness of approximately 80 μm. Thus, positive electrodes were prepared.

Preparation of negative electrodes

A rolled sheet of metallic lithium or Li—Al alloy (with a Li content of 20.6 wt %) was punched in an argon atmosphere into a disk with a diameter of 10 mm and a thickness of 1.0 mm. Thus, two kinds of negative electrodes were prepared.

Fabrication of lithium secondary batteries

Flat lithium secondary batteries B1 through B4 (present batteries (B)) were fabricated by using the respective positive electrodes and the respective negative electrodes. The electrolyte and the separator used in each battery were the same as those used in Experiment 1.

Charge-discharge cycle test

Each battery was discharged to 1.5 V with 100 μA at 25° C., and then 50 charge-discharge cycles were run in each cycle of which the battery was charged to 3.0 V with 100 μA and discharged to 1.5 V with 100 μA at 25° C., so as to obtain the capacity retention ratio (%). The capacity retention ratios (%) of the respective batteries are shown in Table 2. The average discharge voltage was approximately 2.0 V in the battery B1, approximately 1.6 V in the battery B2, approximately 2.0 V in the battery B3 and approximately 1.6 V in the battery B4. The initial capacity was 1.33 mAh in the batteries B1 and B2 and 1.34 mAh in the batteries B3 and B4.

TABLE 2

| Battery | Positive electrode active material | Negative electrode active material | Capacity retention ratio (%) |
|---|---|---|---|
| B1 | $Cu_{0.2}Mo_{0.8}S_2$ | Metallic lithium | 72 |
| B2 | $Cu_{0.2}Mo_{0.8}S_2$ | Li-Al alloy | 78 |
| B3 | $Ti_{0.2}Mo_{0.8}S_2$ | Metallic lithium | 73 |
| B4 | $Ti_{0.2}Mo_{0.8}S_2$ | Li-Al alloy | 78 |

It is understood from Table 2 that the present batteries B1 through B4 have capacity retention ratios as large as 72 through 78% and can exhibit good charge-discharge cycle performance. The capacity retention ratios of the present batteries B1 through B4 are smaller than those of the present batteries A1 through A26 probably because a compound such as $LiS_2$ that can cause inactivation deposited on the surface of the negative electrode due to a reaction between sulfur dissolved in a slight amount in the electrolyte and lithium included in the negative electrode.

Experiment 3

Lithium secondary batteries (present batteries (C)) each of which uses $LiCoO_2$, $LiNiO_2$ or $LiMn_2O_4$ as a positive electrode active material and a composite sulfide not including lithium as a negative electrode active material and needs charge before initial use were fabricated, so as to examine the charge-discharge cycle performance thereof.

Preparation of positive electrodes

A mixture including 85 parts by weight of a $LiCoO_2$ powder, a $LiNiO_2$ powder or a $LiMn_2O_4$ powder having an average particle size of 10 μm, 10 parts by weight of a carbon powder serving as a conductive agent and 5 parts by weight of a poly(vinylidene fluoride) powder serving as a binder was kneaded with NMP to give slurry. The slurry was applied on one surface of an aluminum collector with a thickness of 20 μm by the doctor blade method, and the resultant was dried at 150° C. and then punched into a disk with a diameter of 10 mm and a thickness of approximately 80 μm. Thus, three kinds of positive electrodes were prepared.

Preparation of negative electrodes

Cu, Mo and S each with purity of 99.9% were mixed in a mortar in an atomic ratio of 0.2:0.8:2.0, and the resultant mixture was pressed in a mold with a diameter of 17 mm at a pressure of 115 kg/cm². The resultant was baked in an argon atmosphere at 1000° C. for 10 hours, and the thus obtained baked substance was crushed in a mortar, thereby preparing a powder having an average particle size of 10 μm of a molybdenum composite sulfide represented by a composition formula, $Cu_{0.2}Mo_{0.8}S_2$. Furthermore, the same procedures were repeated with Cu replaced with Ti, thereby preparing a powder having an average particle size of 10 μm of a molybdenum composite sulfide represented by a composition formula, $Ti_{0.2}Mo_{0.8}S_2$.

A mixture including 85 parts by weight of any of the molybdenum composite sulfide powders, 10 parts by weight of a carbon powder serving as a conductive agent and 5 parts by weight of a poly(vinylidene fluoride) powder serving as a binder was kneaded with NMP to give slurry. The slurry was applied on one surface of a copper collector with a thickness of 20 μm by the doctor blade method, and the resultant was dried at 150° C. and then punched into a disk with a diameter of 10 mm and a thickness of approximately 80 μm. Thus, negative electrodes were prepared.

Fabrication of lithium secondary batteries

Flat lithium secondary batteries C1 through C6 (present batteries (C)) were fabricated by using the respective positive electrodes and the respective negative electrodes prepared as described above. The electrolyte and the separator used in each battery were the same as those used in Experiment 1.

Charge-discharge cycle test

With respect to each battery, 50 charge-discharge cycles were run in each cycle of which the battery was charged to 2.5 V with 100 μA and discharged to 0.5 V with 100 μA at 25° C., so as to obtain the capacity retention ratio (%). The capacity retention ratios (%) of the respective batteries are shown in Table 3. In the batteries C1 through C6, the average discharge voltage was 1.5 through 1.7 V and the initial capacity was 1.33 through 1.34 mAh.

TABLE 3

| Battery | Positive electrode active material | Negative electrode active material | Capacity retention ratio (%) |
|---|---|---|---|
| C1 | $LiCoO_2$ | $Cu_{0.2}Mo_{0.8}S_2$ | 98 |
| C2 | $LiNiO_2$ | $Cu_{0.2}Mo_{0.8}S_2$ | 98 |
| C3 | $LiMn_2O_4$ | $Cu_{0.2}Mo_{0.8}S_2$ | 96 |
| C4 | $LiCoO_2$ | $Ti_{0.2}Mo_{0.8}S_2$ | 98 |
| C5 | $LiNiO_2$ | $Ti_{0.2}Mo_{0.8}S_2$ | 98 |
| C6 | $LiMn_2O_4$ | $Ti_{0.2}Mo_{0.8}S_2$ | 96 |

It is understood from Table 3 that the present batteries C1 through C6 have very large capacity retention ratios of 96% or more and can exhibit good charge-discharge cycle performance. The capacity retention ratios are thus very large probably because the molybdenum composite sulfide used in the negative electrode can be suppressed from being excessively charged due to the charge voltage as low as approximately 2.5 V. In the present batteries A1 through A26 and B1 through B4, the charge voltage was approximately 3.0 V.

Comparative Experiment

The following two types of lithium secondary batteries (comparative batteries) were fabricated, so as to examine the charge-discharge cycle performance thereof: One type of comparative batteries use $MoS_2$ including lithium, a mixture of $MoS_2$ including lithium and Cu or a mixture of $MoS_2$ including lithium and Ti as a positive electrode active material and natural graphite as a negative electrode active material, and need charge before initial use; and the other type of comparative batteries use a mixture of $MoS_2$ and Cu or a mixture of $MoS_2$ and Ti as a positive electrode active material and metallic lithium or Li—Al alloy as a negative electrode active material, and do not need charge before initial use.

Positive electrodes were prepared in the same manner as in Experiment 1 except that 85 parts by weight of the molybdenum composite sulfide powder was replaced with 85 parts by weight of a $MoS_2$ powder, 85 parts by weight of a mixture of a $MoS_2$ powder and a Cu powder in a weight ratio of 100:5, or 85 parts by weight of a mixture of a $MoS_2$ powder and a Ti powder in a weight ratio of 100:5. By using these positive electrodes, lithium secondary batteries X1, X2 and X3 (comparative batteries) were fabricated in the same manner as in Experiment 1.

Furthermore, other positive electrodes were prepared in the same manner as in Experiment 1 except that 85 parts by weight of the molybdenum composite sulfide powder was replaced with 85 parts by weight of a mixture of a $MoS_2$ powder and a Cu powder with an average particle size of 5 $\mu$m in a weight ratio of 100:5 or 85 parts by weight of a mixture of a $MoS_2$ powder and a Ti powder with an average particle size of 5 $\mu$m in a weight ratio of 100:5 (whereas lithium was not incorporated after preparation of the positive electrodes). By using these positive electrodes and the same negative electrodes as any of the two kinds of negative electrodes used in the present batteries B1 through B4, lithium secondary batteries X4 through X7 (comparative batteries) were fabricated in the same manner as in Experiment 1.

Each of the batteries X1 through X3 was subjected to the charge-discharge cycle test under the same conditions as in Experiment 1, and each of the batteries X4 through X7 was subjected to the charge-discharge cycle test under the same conditions as in Experiment 2, so as to obtain the capacity retention ratio (%). The capacity retention ratios (%) of the respective batteries are shown in Table 4. The average discharge voltage was 2.0 V in the batteries X1 through X5 and 1.6 V in the batteries X6 and X7, and the initial capacity was 1.17 through 1.29 mAh in all the batteries. The charge voltage was approximately 3.0 V in all the batteries.

TABLE 4

| Battery | Positive electrode active material | Negative electrode active material | Capacity retention ratio (%) |
|---|---|---|---|
| X1 | $MoS_2$ | Natural graphite | 59 |
| X2 | $MoS_2$ including Cu | Natural graphite | 52 |
| X3 | $MoS_2$ including Ti | Natural graphite | 54 |
| X4 | $MoS_2$ including Cu | Metallic lithium | 41 |

TABLE 4-continued

| Battery | Positive electrode active material | Negative electrode active material | Capacity retention ratio (%) |
|---|---|---|---|
| X5 | $MoS_2$ including Ti | Metallic lithium | 42 |
| X6 | $MoS_2$ including Cu | Li-Al alloy | 46 |
| X7 | $MoS_2$ including Ti | Li-Al alloy | 48 |

It is understood from Table 4 that the comparative batteries X1 through X7 have capacity retention ratios as small as 41 through 59% and have charge-discharge cycle performance much worse than that of the present batteries.

Experiment 4

The relationship between X in the composition formula, $M_X M_{1-X} S_Y$, representing a molybdenum composite sulfide and the charge-discharge cycle performance was examined. In this experiment, Cu and Ti were used as the element M.

Figure 2:
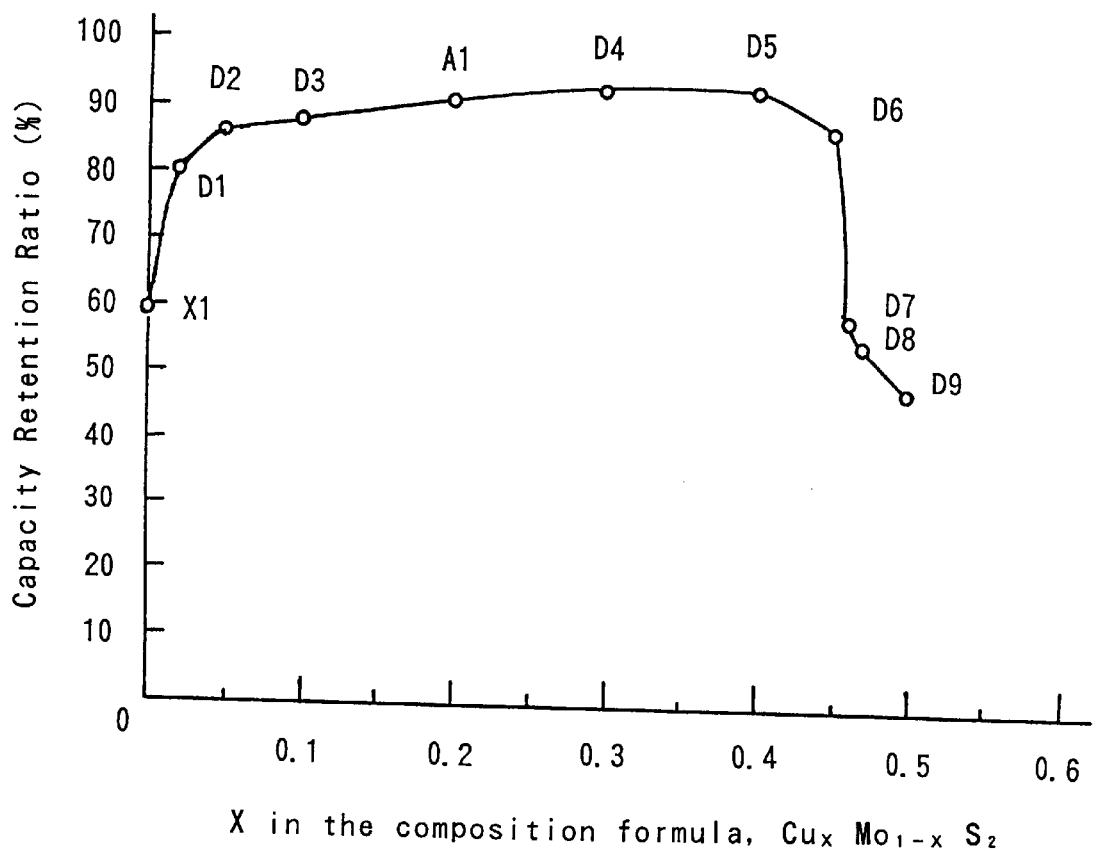
FIG. 2 is a graph for showing the relationship between X in a composition formula, $Cu_XMo_{1-X}S_2$, representing a molybdenum composite sulfide and a capacity retention ratio.

Lithium secondary batteries D1 through D9 were fabricated in the same manner as in Experiment 1 except that the molybdenum composite sulfide powder having an average particle size of 10 $\mu$m and represented by the composition formula, $Cu_{0.2}Mo_{0.8}S_2$, used as the positive electrode active material was replaced with powders each having an average particle size of 10 $\mu$m of molybdenum composite sulfides respectively represented by composition formulas, $Cu_{0.02}Mo_{0.98}S_2$, $Cu_{0.05}Mo_{0.95}S_2$, $Cu_{0.1}Mo_{0.9}S_2$, $Cu_{0.3}Mo_{0.7}S_2$, $Cu_{0.4}Mo_{0.6}S_2$, $Cu_{0.45}Mo_{0.55}S_2$, $Cu_{0.46}Mo_{0.54}S_2$, $Cu_{0.47}Mo_{0.53}S_2$ and $Cu_{0.5}Mo_{0.5}S_2$ (into which lithium was after preparation of the positive electrodes as in Experiment 1). The lithium secondary batteries D1 through D9 were subjected to the charge-discharge cycle test under the same conditions as in Experiment 1, so as to obtain the capacity retention ratios (%) thereof. Among these batteries, the batteries D1 through D6 are present batteries (present batteries (A)) and the batteries D7 through D9 are comparative batteries. The capacity retention ratios (%) of the batteries are shown in FIG. 2. FIG. 2 is a graph with the ordinate indicating the capacity retention ratio and the abscissa indicating X in the composition formula, $Cu_X Mo_{1-X} S_2$. The capacity retention ratios of the batteries A1 (wherein X is 0.2) and X1 (wherein X is 0) are also shown in FIG. 2. In the batteries D1 through D9, the average discharge voltage was 2.0 V and the initial capacity was 0.71 through 1.25 mAh.

Figure 3:
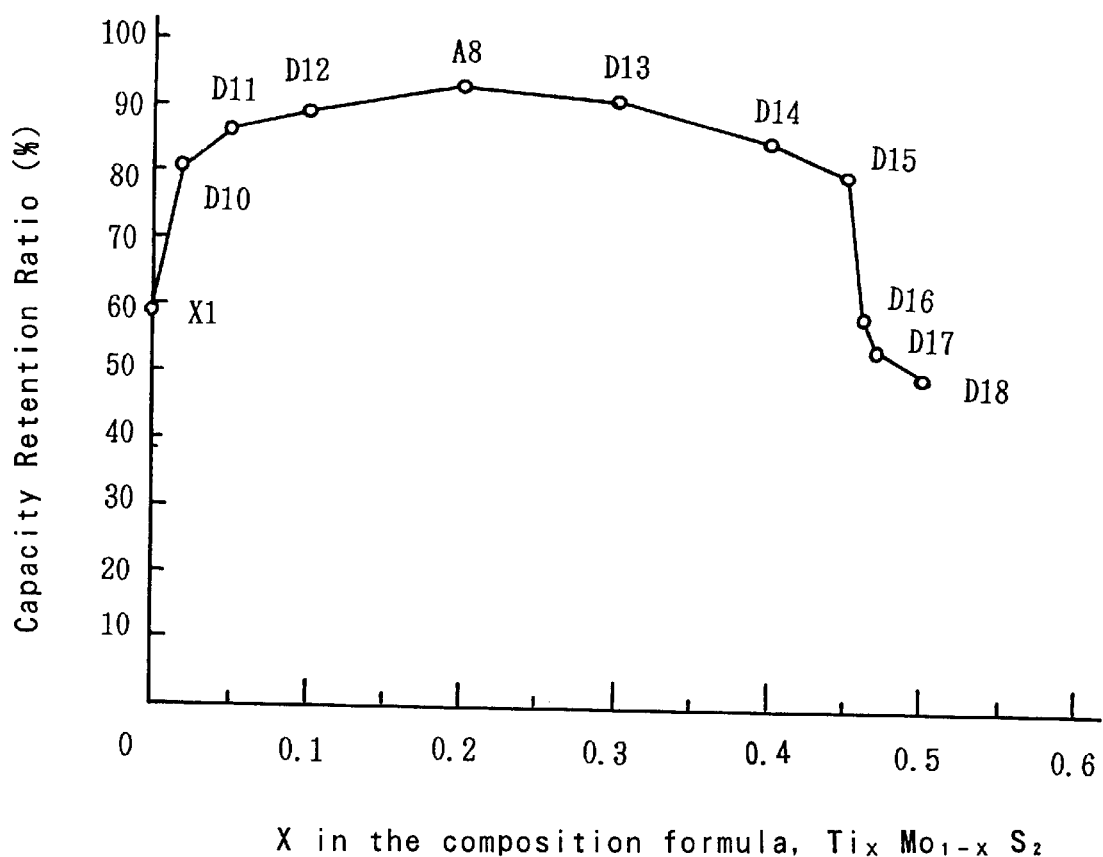
FIG. 3 is a graph for showing the relationship between X in a composition formula, $Ti_XMo_{1-X}S_2$, representing a molybdenum composite sulfide and a capacity retention ratio.

Lithium secondary batteries D10 through D18 were fabricated in the same manner as in Experiment 1 except that the molybdenum composite sulfide powder having an average particle size of 10 $\mu$m and represented by a formula, $Ti_{0.2}Mo_{0.8}S_2$, used as the positive electrode active material was replaced with powders each having an average particle size of 10 $\mu$m of molybdenum composite sulfides respectively represented by composition formulas, $Ti_{0.02}Mo_{0.98}S_2$, $Ti_{0.05}Mo_{0.95}S_2$, $Ti_{0.1}Mo_{0.9}S_2$, $Ti_{0.3}Mo_{0.7}S_2$, $Ti_{0.4}Mo_{0.6}S_2$, $Ti_{0.45}Mo_{0.55}S_2$, $Ti_{0.46}Mo_{0.54}S_2$, $Ti_{0.47}Mo_{0.53}S_2$ and $Ti_{0.5}Mo_{0.5}S_2$ (into which lithium was incorporated after preparation of the positive electrodes as in Experiment 1). The lithium secondary batteries D10 through D18 were subjected to the charge-discharge cycle test under the same conditions as in Experiment 1, so as to obtain the capacity retention ratios (%) thereof. Among these batteries, the batteries D10 through D15 are present batteries (present batteries (A)) and the batteries D16 through D18 are comparative batteries. The capacity retention ratios (%) of the batteries are shown in FIG. 3. FIG. 3 is a graph with the ordinate indicating the capacity retention ratio and the abscissa indicating X in the composition formula, $Ti_xMo_{1-x}S_2$. The capacity retention ratios of the batteries A8 (wherein X is 0.2) and X1 (wherein X is 0) are also shown in FIG. 2. In the batteries D10 through D18, the average discharge voltage was 2.0 V and the initial capacity was 0.73 through 1.33 mAh.

It is understood from FIGS. 2 and 3 that the charge-discharge cycle performance can be improved when 0<X<0.46 in both the cases where the element M is Cu and Ti, respectively. Furthermore, in considering that the batteries A1, D1 through D6, A8 and D10 through D15 have large capacity retention ratios of 80% or more, it is understood that $0.02 \leq X \leq 0.45$ is preferred.

Experiment 5

The relationship between Y in the composition formula, $M_xMo_{1-x}S_Y$, representing a molybdenum composite sulfide and the charge-discharge cycle performance was examined. In this experiment, Cu and Ti were used as the element M.

Figure 4:
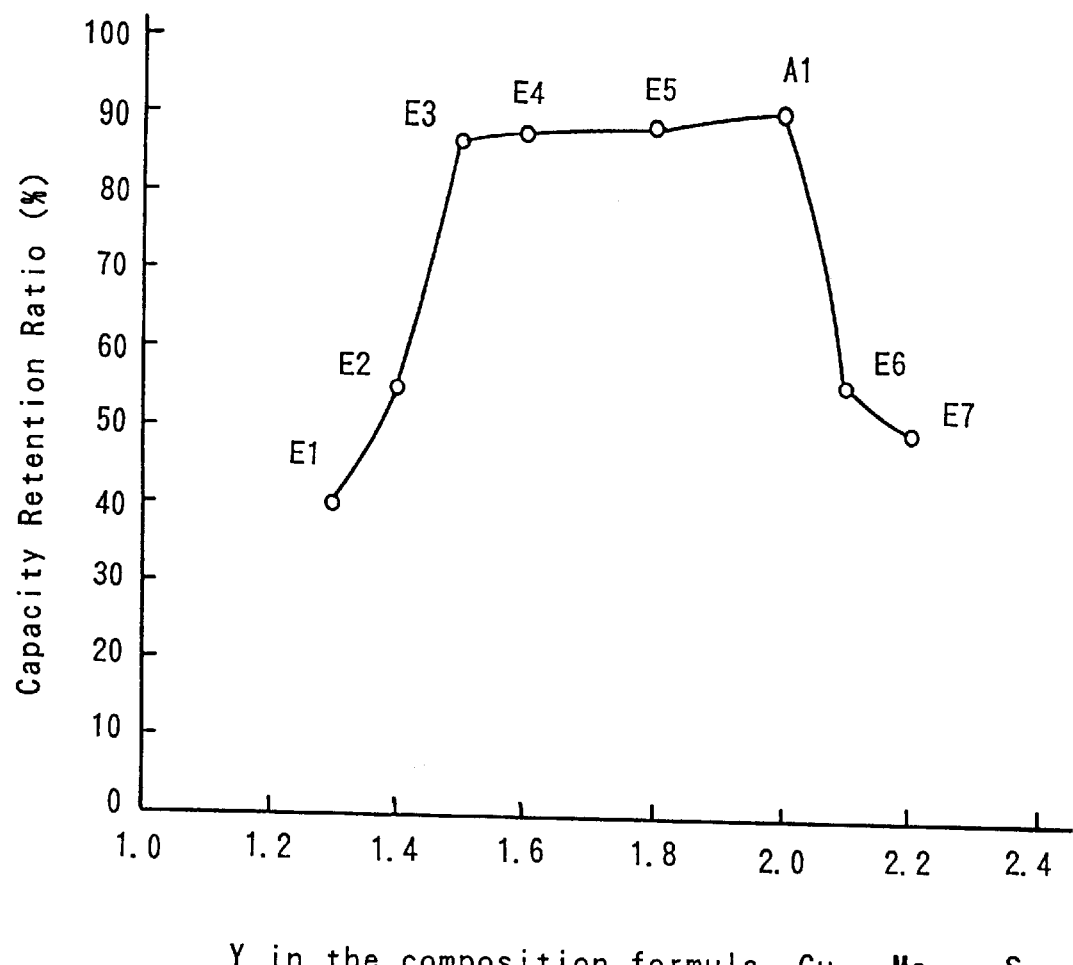
FIG. 4 is a graph for showing the relationship between Y in a composition formula, $Cu_{0.2}Mo_{0.8}S_Y$, representing a molybdenum composite sulfide and a capacity retention ratio.

Lithium secondary batteries E1 through E7 were fabricated in the same manner as in Experiment 1 except that the molybdenum composite sulfide powder having an average particle size of 10 μm and represented by the composition formula, $Cu_{0.2}Mo_{0.8}S_2$, used as the positive electrode active material was replaced with powders each having an average particle size of 10 μm of molybdenum composite sulfides respectively represented by composition formulas, $Cu_{0.2}Mo_{0.8}S_{1.3}$, $Cu_{0.2}Mo_{0.8}S_{1.4}$, $CU_{0.2}Mo_{0.8}S_{1.5}$, $Cu_{0.2}Mo_{0.8}S_{1.6}$, $Cu_{0.2}Mo_{0.8}S_{1.8}$, $Cu_{0.2}Mo_{0.8}S_{2.1}$ and $Cu_{0.2}Mo_{0.8}S_{2.2}$ (into which lithium was incorporated after preparation of the positive electrodes as in Experiment 1). The lithium secondary batteries E1 through E7 were subjected to the charge-discharge cycle test under the same conditions as in Experiment 1, so as to obtain the capacity retention ratios (%) thereof. Among these batteries, the batteries E3 through E5 are present batteries (present batteries (A)) and the batteries E1, E2, E6 and E7 are comparative batteries. The capacity retention ratios (%) of the batteries are shown in FIG. 4. FIG. 4 is a graph with the ordinate indicating the capacity retention ratio and the abscissa indicating Y in the composition formula, $Cu_{0.2}Mo_{0.8}S_Y$. The capacity retention ratio of the battery A1 (wherein Y is 2.0) is also shown in FIG. 4. In the batteries E1 through E7, the average discharge voltage was approximately 2.0 V and the initial capacity was 1.21 through 1.56 mAh.

Figure 5:
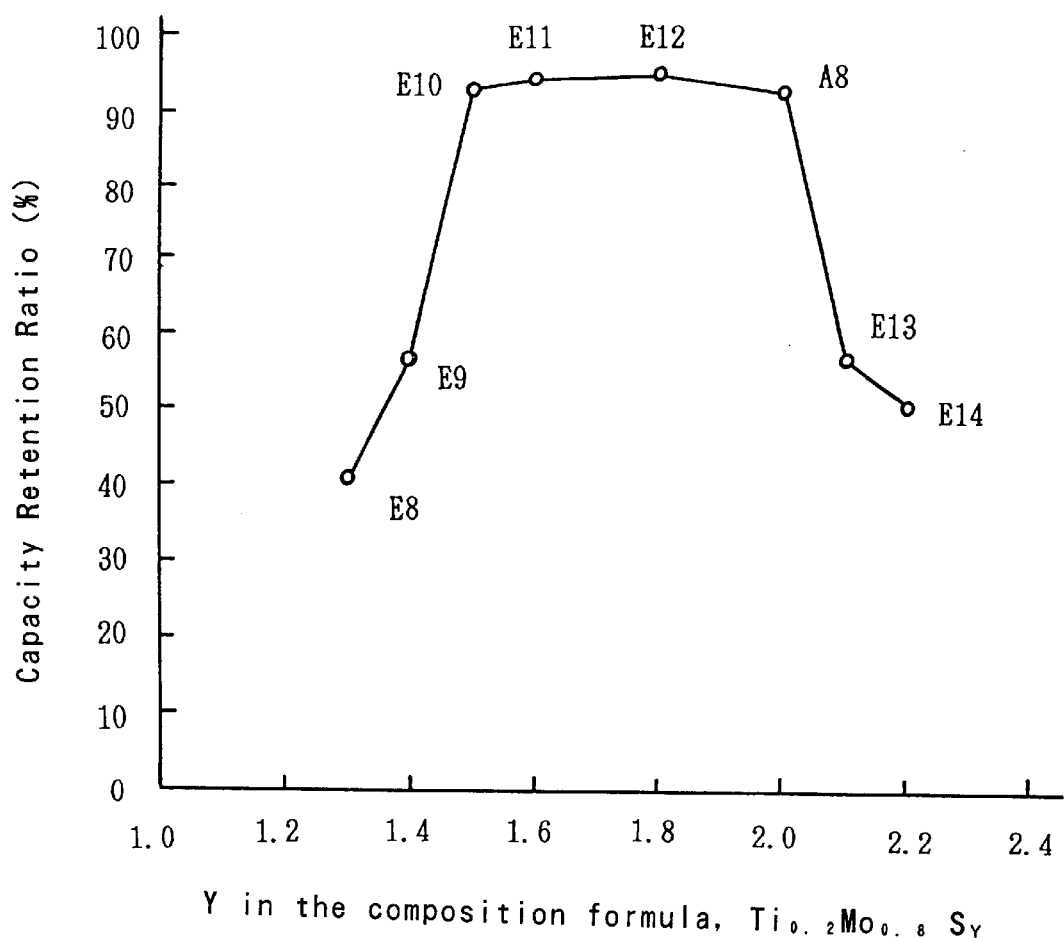
FIG. 5 is a graph for showing the relationship between Y in a composition formula, $Ti_{0.2}Mo_{0.8}S_Y$, representing a molybdenum composite sulfide and a capacity retention ratio.

Lithium secondary batteries E8 through E14 were fabricated in the same manner as in Experiment 1 except that the molybdenum composite sulfide powder having an average particle size of 10 μm and represented by the composition formula, $Ti_{0.2}Mo_{0.8}S_2$, used as the positive electrode active material was replaced with powders each having an average particle size of 10 μm of molybdenum composite sulfides respectively represented by composition formulas, $Ti_{0.2}Mo_{0.8}S_{1.3}$, $Ti_{0.2}Mo_{0.8}S_{1.4}$, $Ti_{0.2}Mo_{0.8}S_{1.5}$, $Ti_2Mo_{0.8}S_{1.6}$, $Ti_{0.2}Mo_{0.8}S_{1.8}$, $Ti_{0.2}Mo_{0.8}S_{2.1}$ and $Ti_{0.2}Mo_{0.8}S_{2.2}$ (into which lithium was incorporated after preparation of the positive electrodes as in Experiment 1). The lithium secondary batteries E8 through E14 were subjected to the charge-discharge cycle test under the same conditions as in Experiment 1, so as to obtain the capacity retention ratios (%) thereof. Among these batteries, the batteries E10 through E12 are present batteries (present batteries (A)) and the batteries E8, E9, E13 and E14 are comparative batteries. The capacity retention ratios (%) of the batteries are shown in FIG. 5. FIG. 5 is a graph with the ordinate indicating the capacity retention ratio and the abscissa indicating Y in the composition formula, $Ti_{0.2}Mo_{0.8}S_Y$. The capacity retention ratio of the battery A8 (wherein Y is 2.0) is also shown in FIG. 5. In the batteries E8 through E14, the average discharge voltage was approximately 2.0 V and the initial capacity was 1.21 through 1.57 mAh.

It is understood from FIGS. 4 and 5 that the charge-discharge cycle performance is improved when $1.5 \leq Y \leq 2.0$ in both the cases where the element M is Cu and Ti, respectively.

Experiment 6

The relationship between the baking temperature adopted in preparing a molybdenum composite sulfide and the charge-discharge cycle performance was examined. In this experiment, Cu and Ti were used as the element M.

Figure 6:
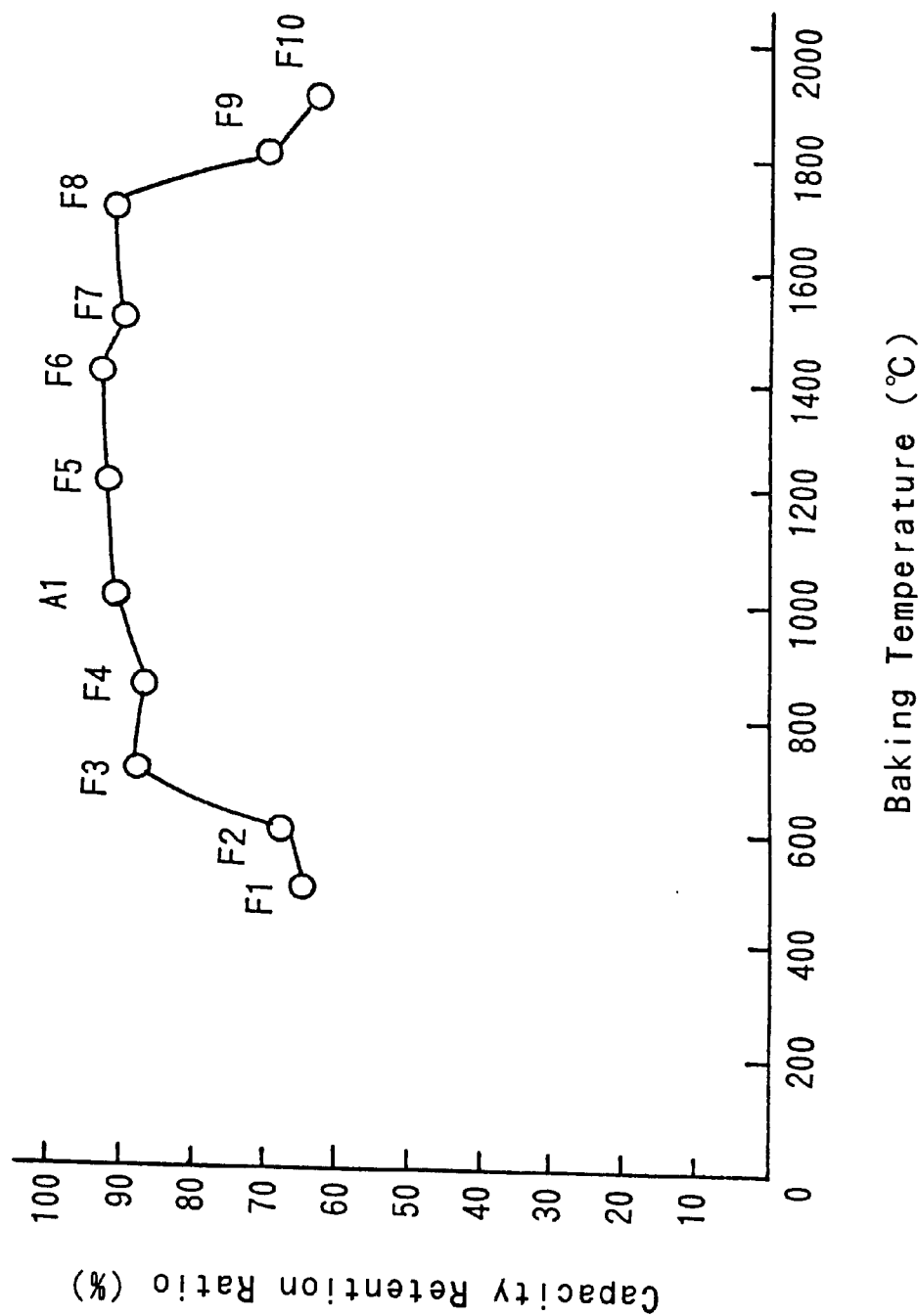
FIG. 6 is a graph for showing the relationship between a baking temperature for preparing a molybdenum composite sulfide represented by a composition formula, $Cu_{0.2}Mo_{0.8}S_2$, and a capacity retention ratio.

Lithium secondary batteries F1 through F10 were fabricated in the same manner as in Experiment 1 except that the molybdenum composite sulfide powder represented by the formula, $Cu_{0.2}Mo_{0.8}S_2$, was baked at 500° C., 600° C., 700° C., 850° C., 1200° C., 1400° C., 1500° C., 1700° C., 1800° C. or 1900° C. instead of 1000° C. in the preparation of positive electrodes. The lithium secondary batteries F1 through F10 were subjected to the charge-discharge cycle test under the same conditions as in Experiment 1, so as to obtain the capacity retention ratios (%) thereof. The capacity retention ratios (%) of the respective batteries are shown in FIG. 6. FIG. 6 is a graph with the ordinate indicating the capacity retention ratio (%) and the abscissa indicating the baking temperature (° C.). The capacity retention ratio of the battery A1 (wherein the baking temperature is 1000° C.) is also shown in FIG. 6. In the batteries F1 through F10, the average discharge voltage was 2.0 V and the initial capacity was 1.30 mAh.

Figure 7:
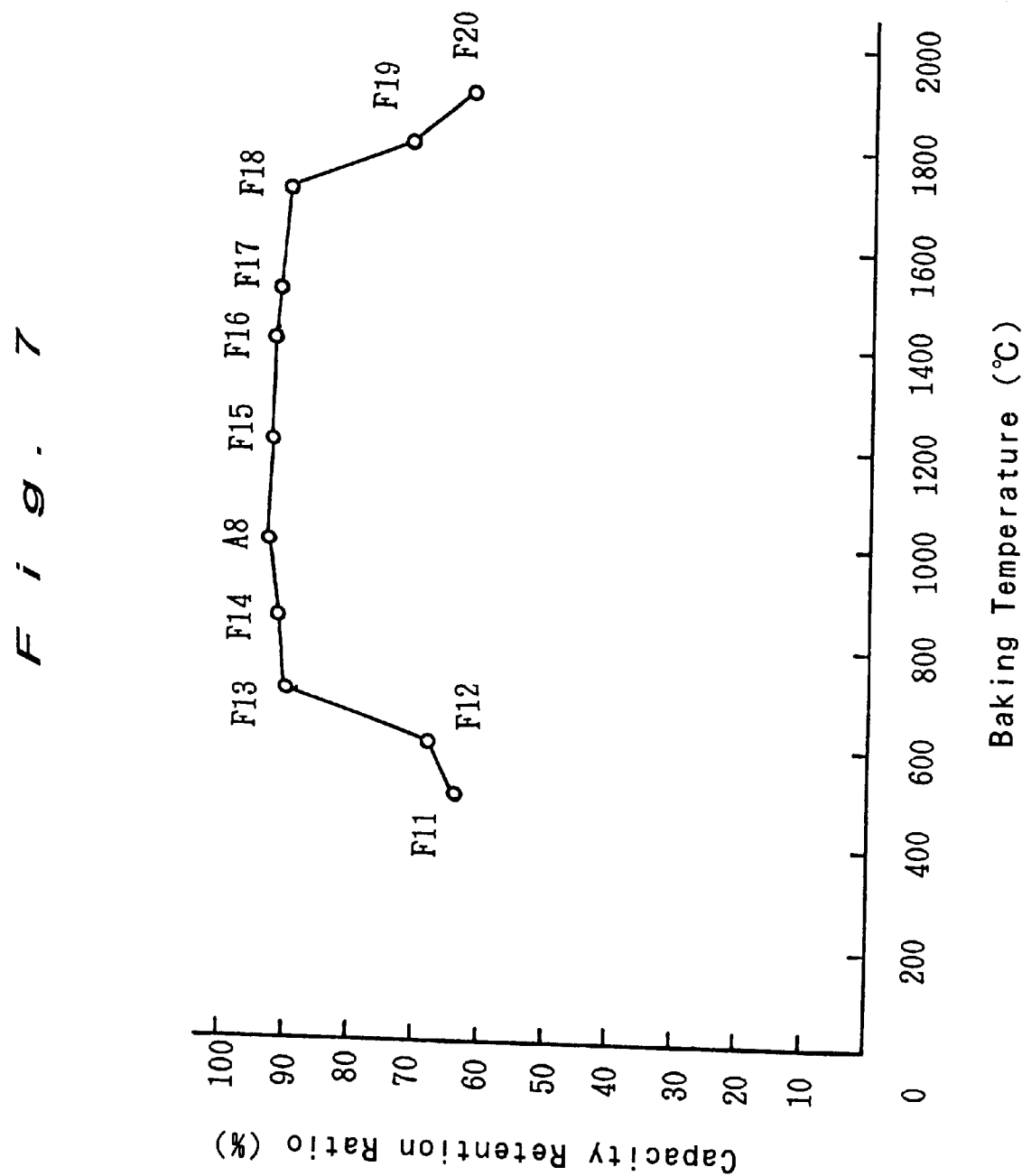
FIG. 7 is a graph for showing the relationship between a baking temperature for preparing a molybdenum composite sulfide represented by a composition formula, $Ti_{0.2}Mo_{0.8}S_2$, and a capacity retention ratio.

Lithium secondary batteries F11 through F20 were fabricated in the same manner as in Experiment 1 except that the molybdenum composite sulfide powder represented by the formula, $Ti_{0.2}Mo_{0.8}S_2$, was baked at 500° C., 600° C., 700° C., 850° C., 1200° C., 1400° C., 1500° C., 1700° C., 1800° C. or 1900° C. instead of 1000° C. in the preparation of positive electrodes. The lithium secondary batteries F11 through F20 were subjected to the charge-discharge cycle test under the same conditions as in Experiment 1, so as to obtain the capacity retention ratios (%) thereof. The capacity retention ratios (%) of the respective batteries are shown in FIG. 7. FIG. 7 is a graph with the ordinate indicating the capacity retention ratio (%) and the abscissa indicating the baking temperature (° C.). The capacity retention ratio of the battery A8 (wherein the baking temperature is 1000° C.) is also shown in FIG. 7. In the batteries F11 through F20, the average discharge voltage was 2.0 V and the initial capacity was 1.26 through 1.33 mAh.

It is understood from FIGS. 6 and 7 that the baking temperature for preparing the molybdenum composite sulfide is preferably 700 through 1700° C. in both the cases where the element M is Cu and Ti, respectively.

Although the flat lithium secondary batteries were described in the aforementioned embodiments, the invention is not limited in the shape of batteries but is applicable to lithium secondary batteries in a variety of shapes including a cylindrical shape.

Obviously, numerous modifications and variations of the present invention are possible in light of the above teachings. It is therefore to be understood that within the scope of the appended claims the invention may be practiced otherwise than as specifically described herein.

What is claimed is:

1. A lithium secondary battery comprising a positive electrode, a negative electrode and a nonaqueous electrolyte, the positive electrode or the negative electrode including an active material of a composite sulfide having the same crystal structure as $MoS_2$ or $Mo_2S_3$ or the composite sulfide including lithium, and the composite sulfide being represented by a formula, $M_X Mo_{1-X} S_Y$, in which M is at least one element selected from the group consisting of Cu, V, Cr, Mn, Fe, Co, Ni, Ti, Y, Cd, In, La, Ce, Pr, Nd, Sm, W, Pt, Pb, Ca, Sr and Ba; $0<X<0.46$; and $1.5 \leq Y \leq 2.0$.

2. The lithium secondary battery according to claim 1, wherein $0.02 \leq X \leq 0.45$.

3. The lithium secondary battery according to claim 1, wherein M is at least one element selected from the group consisting of V, Cr, Mn, Ni, Ti, Y, La, Ce, Nd, Sm, Ca, Sr and Ba.

4. The lithium secondary battery according to claim 1, wherein M is at least one element selected from the group consisting of Mn, Ce and Ca.

5. A lithium secondary battery comprising a positive electrode, a negative electrode and a nonaqueous electrolyte, which needs charge before initial use, the positive electrode including an active material of a composite sulfide having the same crystal structure as $MoS_2$ or $Mo_2S_3$ and including lithium, the composite sulfide being represented by a formula, $M_X Mo_{1-X} S_Y$, in which M is at least one element selected from the group consisting of Cu, V, Cr, Mn, Fe, Co, Ni, Ti, Y, Cd, In, La, Ce, Pr, Nd, Sm, W, Pt, Pb, Ca, Sr and Ba; $0<X<0.46$; and $1.5 \leq Y \leq 2.0$, and the negative electrode including an active material of a carbon material.

6. The lithium secondary battery according to claim 5, wherein $0.02 \leq X \leq 0.45$.

7. The lithium secondary battery according to claim 5, wherein M is at least one element selected from the group consisting of V, Cr, Mn, Ni, Ti, Y, La, Ce, Nd, Sm, Ca, Sr and Ba.

8. The lithium secondary battery according to claim 5, wherein M is at least one element selected from the group consisting of Mn, Ce and Ca.

9. A lithium secondary battery comprising a positive electrode, a negative electrode and a nonaqueous electrolyte, which does not need charge before initial use, the positive electrode including an active material of a composite sulfide having the same crystal structure as $MoS_2$ or $Mo_2S_3$, the composite sulfide being represented by a formula, $M_X Mo_{1-X} S_Y$, in which M is at least one element selected from the group consisting of Cu, V, Cr, Mn, Fe, Co, Ni, Ti, Y, Cd, In, La, Ce, Pr, Nd, Sm, W, Pt, Pb, Ca, Sr and Ba; $0<X<0.46$; and $1.5 \leq Y \leq 2.0$, and the negative electrode including an active material of a lithium-containing carbon material.

10. The lithium secondary battery according to claim 9, wherein $0.02 \leq X \leq 0.45$.

11. The lithium secondary battery according to claim 9, wherein M is at least one element selected from the group consisting of V, Cr, Mn, Ni, Ti, Y, La, Ce, Nd, Sm, Ca, Sr and Ba.

12. The lithium secondary battery according to claim 9, wherein M is at least one element selected from the group consisting of Mn, Ce and Ca.

13. A lithium secondary battery comprising a positive electrode, a negative electrode and a nonaqueous electrolyte, which needs charge before initial use, the positive electrode including an active material of a lithium-containing transition metal oxide, the negative electrode including an active material of a composite sulfide having the same crystal structure as $MoS_2$ or $Mo_2S_3$, and the composite sulfide being represented by a formula, $M_X Mo_{1-X} S_Y$, in which M is at least one element selected from the group consisting of Cu, V, Cr, Mn, Fe, Co, Ni, Ti, Y, Cd, In, La, Ce, Pr, Nd, Sm, W, Pt, Pb, Ca, Sr and Ba; $0<X<0.46$; and $1.5 \leq Y \leq 2.0$.

14. The lithium secondary battery according to claim 13, wherein $0.02 \leq X \leq 0.45$.

15. The lithium secondary battery according to claim 13, wherein M is at least one element selected from the group consisting of V, Cr, Mn, Ni, Ti, Y, La, Ce, Nd, Sm, Ca, Sr and Ba.

16. The lithium secondary battery according to claim 13, wherein M is at least one element selected from the group consisting of Mn, Ce and Ca.

17. The lithium secondary battery according to any of claims 1 through 16,
wherein the composite sulfide is a powder obtained by baking a mixture of simple substances and/or compounds of composing elements at 700 through 1700° C. and crushing the baked mixture.

* * * * *